US011128437B1

(12) United States Patent
Nossik et al.

(10) Patent No.: US 11,128,437 B1
(45) Date of Patent: Sep. 21, 2021

(54) DISTRIBUTED LEDGER FOR PEER-TO-PEER CLOUD RESOURCE SHARING

(71) Applicant: EMC IP Holding Company LLC, Hopkinton, MA (US)

(72) Inventors: Misha Nossik, Ottawa (CA); Lejin Du, Kanata (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 668 days.

(21) Appl. No.: 15/473,848

(22) Filed: Mar. 30, 2017

(51) Int. Cl.
*H04L 29/08* (2006.01)
*H04L 29/06* (2006.01)
(Continued)

(52) U.S. Cl.
CPC ........ *H04L 9/0637* (2013.01); *H04L 63/0815* (2013.01); *H04L 67/104* (2013.01); *H04L 67/146* (2013.01); *H04L 12/66* (2013.01)

(58) Field of Classification Search
CPC . H04L 9/0637; H04L 63/0815; H04L 67/104; H04L 67/146
See application file for complete search history.

(56) References Cited

U.S. PATENT DOCUMENTS

| 6,577,734 B1 | 6/2003 | Etzel et al. |
| 7,814,318 B1 | 10/2010 | Perlman et al. |

(Continued)

FOREIGN PATENT DOCUMENTS

| CN | 103810046 A | 5/2014 |
| CN | 103870314 A | 6/2014 |

(Continued)

OTHER PUBLICATIONS

U.S. Appl. No. 14/575,080 filed in the name of R. Wallner et al. filed Dec. 18, 2014 and entitled "Virtual Network Storage Function Layer Comprising One or More Virtual Network Storage Function Instances."

(Continued)

*Primary Examiner* — Jay Huang
*Assistant Examiner* — Courtney P Jones
(74) *Attorney, Agent, or Firm* — Ryan, Mason & Lewis, LLP

(57) ABSTRACT

An apparatus in one embodiment comprises at least one processing device having a processor coupled to a memory. The processing device is configured to implement a first ledger node of a first cloud having a first set of cloud resources. The first ledger node of the first cloud is configured to communicate over one or more networks with a plurality of additional ledger nodes associated with respective additional clouds having respective additional sets of cloud resources, to establish a cloud resource sharing transaction with at least one of the additional ledger nodes of the additional clouds, and to generate a cryptographic block characterizing the cloud resource sharing transaction. The cryptographic block is entered into a blockchain distributed ledger collectively maintained by the first and additional ledger nodes. The first and additional ledger nodes collectively maintain the blockchain distributed ledger on a peer-to-peer basis without utilizing a centralized transaction authority.

20 Claims, 6 Drawing Sheets

(51) Int. Cl.
*H04L 12/66* (2006.01)
*H04L 9/06* (2006.01)

(56) References Cited

U.S. PATENT DOCUMENTS

| | | | |
|---|---|---|---|
| 8,417,747 | B1 | 4/2013 | Hayden et al. |
| 8,650,657 | B1 | 2/2014 | Shankar et al. |
| 8,898,402 | B1 | 11/2014 | Stronge |
| 9,071,429 | B1 | 6/2015 | Roth et al. |
| 9,407,664 | B1 | 8/2016 | Banerjee |
| 2003/0002668 | A1 | 1/2003 | Graunke et al. |
| 2005/0018853 | A1 | 1/2005 | Lain et al. |
| 2006/0282666 | A1 | 12/2006 | Kim |
| 2006/0288232 | A1 | 12/2006 | Ho et al. |
| 2007/0226809 | A1 | 9/2007 | Ellard |
| 2007/0245410 | A1 | 10/2007 | Perlman et al. |
| 2008/0256607 | A1 | 10/2008 | Janedittakarn et al. |
| 2009/0110191 | A1 | 4/2009 | Sanvido et al. |
| 2010/0235649 | A1 | 9/2010 | Jeffries et al. |
| 2011/0158405 | A1 | 6/2011 | Choi et al. |
| 2011/0276713 | A1 | 10/2011 | Brand |
| 2011/0283113 | A1 | 11/2011 | Moffat et al. |
| 2012/0072716 | A1 | 3/2012 | Hu et al. |
| 2012/0173488 | A1 | 7/2012 | Spielberg et al. |
| 2012/0174113 | A1 | 7/2012 | Pohlmann |
| 2012/0180039 | A1 | 7/2012 | Bravery et al. |
| 2012/0278621 | A1 | 11/2012 | Woloszyn |
| 2012/0284528 | A1 | 11/2012 | Orovitz |
| 2013/0145006 | A1 | 6/2013 | Tammam |
| 2013/0305057 | A1 | 11/2013 | Greco et al. |
| 2013/0322621 | A1 | 12/2013 | Yoon et al. |
| 2014/0006802 | A1 | 1/2014 | Cachin et al. |
| 2014/0025963 | A1 | 1/2014 | Subramanian |
| 2014/0068257 | A1 | 3/2014 | Burckard |
| 2014/0274408 | A1 | 9/2014 | Dave |
| 2014/0283010 | A1 | 9/2014 | Rutkowski et al. |
| 2014/0317618 | A1 | 10/2014 | Behera et al. |
| 2014/0351605 | A1 | 11/2014 | De Atley et al. |
| 2014/0359309 | A1 | 12/2014 | Cachin et al. |
| 2014/0366155 | A1 | 12/2014 | Chang et al. |
| 2015/0019870 | A1 | 1/2015 | Patnala et al. |
| 2015/0046985 | A1* | 2/2015 | D'Souza ............... H04L 63/08 726/4 |
| 2015/0058861 | A1 | 2/2015 | Zheng et al. |
| 2015/0074058 | A1 | 3/2015 | Zhao et al. |
| 2015/0120928 | A1 | 4/2015 | Gummaraju et al. |
| 2016/0259937 | A1 | 9/2016 | Ford et al. |
| 2016/0269371 | A1 | 9/2016 | Coimbatore |
| 2016/0321654 | A1 | 11/2016 | Lesavich et al. |
| 2016/0380977 | A1* | 12/2016 | Bean ............... H04L 63/1408 726/12 |
| 2017/0103468 | A1* | 4/2017 | Orsini ............... G07F 15/003 |
| 2017/0140394 | A1* | 5/2017 | Cao .................. H04L 9/3236 |
| 2018/0068130 | A1* | 3/2018 | Chan ............... G06F 21/6227 |
| 2018/0069849 | A1* | 3/2018 | Kraemer ........... H04L 9/3218 |
| 2018/0075453 | A1* | 3/2018 | Durvasula ........ G06Q 20/389 |
| 2018/0167217 | A1* | 6/2018 | Brady ............... H04L 67/34 |
| 2018/0308134 | A1* | 10/2018 | Manning .......... G06Q 30/0275 |
| 2019/0149429 | A1* | 5/2019 | Stocker ............ H04L 67/104 709/225 |
| 2019/0268284 | A1* | 8/2019 | Karame ........... H04L 9/3236 |
| 2020/0005286 | A1* | 1/2020 | Sewell ............. G06Q 20/3678 |

FOREIGN PATENT DOCUMENTS

| | | |
|---|---|---|
| CN | 104104513 A | 10/2014 |
| EP | 1414181 A1 | 4/2004 |

OTHER PUBLICATIONS sysdig.org, "Universal System Visibility with Native Container Support," 2015, 3 pages.
Encomium To Technology, "Dissecting Docker Security—Part 1," http://goo.gl/35Jr9D, Aug. 12, 2015, 3 pages.
Encomium To Technology, "Aesthetics of Linus Security Modules," http://goo.gl/x12gJD, Aug. 12, 2015, 3 pages.
Netlink, "Linux Programmer's Manual," http://man7.org/llnux/man-pages/man7/netlink.7.html, Jan. 10, 2015, 7 pages.
U.S. Appl. No. 14/752,153 filed in the name of R. Wallner et al. filed Jun. 26, 2015 and entitled "Coordinated Resource Allocation Between Container Groups and Storage Groups."
U.S. Appl. No. 14/819,920 filed in the name of Radia Perlman filed Aug. 6, 2015 and entitled "Storage System Comprising Per-Tenant Encryption Keys Supporting Deduplication Across Multiple Tenants."
U.S. Appl. No. 14/820,026 filed in the name of Vaibhav Khanduja et al. filed Aug. 6, 2015 and entitled "Provisioning Isolated Storage Resource Portions for Respective Containers in Multi-Tenant Environments."
U.S. Appl. No. 14/939,562 filed in the name of Vaibhav Khanduja filed Nov. 12, 2015 and entitled "Intrusion Detection for Storage Resources Provisioned to Containers in Multi-Tenant Environments."
U.S. Appl. No. 15/268,788 filed in the name of Misha Nossik et al. filed Sep. 19, 2016 and entitled "Secure Data Access in Cloud Computing Environments."
U.S. Appl. No. 15/075,858 filed in the name of Misha Nossik et al. filed Mar. 21, 2016 and entitled "Security Layer for Containers in Multi-Tenant Environments."
Clearsky Data, "Welcome to the Global Storage Network Plug In," Data Sheet, 2016, 2 pages.
Velostrata Inc.," Velostrata Move Production Workloads to a Public Cloud In Minutes," Data Sheet, 2016, 2 pages.

* cited by examiner

US 11,128,437 B1

DISTRIBUTED LEDGER FOR PEER-TO-PEER CLOUD RESOURCE SHARING

FIELD

The field relates generally to information processing systems, and more particularly to information processing systems comprising cloud infrastructure.

BACKGROUND

Information processing systems increasingly utilize reconfigurable virtual resources to meet changing user needs in an efficient, flexible and cost-effective manner. For example, cloud computing environments implemented using various types of virtualization techniques are known. These illustratively include operating system level virtualization techniques such as Linux containers. Such containers may be used to provide at least a portion of the cloud infrastructure of a given information processing system. Other types of virtualization such as virtual machines implemented using a hypervisor can additionally or alternatively be used. However, significant challenges remain in implementation of cloud infrastructure. For example, it is often unduly difficult for a given enterprise to share available cloud resources with one or more other enterprises in a secure manner. This can result in significant underutilization or overutilization of the cloud resources of the given enterprise.

SUMMARY

Illustrative embodiments are configured to facilitate cloud resource sharing across multiple enterprises or other entities through peer-to-peer implementation of a distributed ledger. Such arrangements can advantageously allow the enterprises or other entities to achieve relatively higher and more stable utilization levels for their respective sets of cloud resources than would otherwise be possible.

In one embodiment, an apparatus comprises at least one processing device having a processor coupled to a memory. The processing device is configured to implement a first ledger node of a first cloud having a first set of cloud resources. The first ledger node of the first cloud is configured to communicate over one or more networks with a plurality of additional ledger nodes associated with respective additional clouds having respective additional sets of cloud resources, to establish a cloud resource sharing transaction with at least one of the additional ledger nodes of the additional clouds, and to generate a cryptographic block characterizing the cloud resource sharing transaction. The cryptographic block is entered into a blockchain distributed ledger collectively maintained by the first and additional ledger nodes. The first and additional ledger nodes collectively maintain the blockchain distributed ledger on a peer-to-peer basis without utilizing a centralized transaction authority.

Some illustrative embodiments can facilitate the use of cloud resource sharing between otherwise unrelated enterprises by allowing hybrid clouds or other types of clouds of respective ones of the enterprises to be securely federated for cloud resource sharing purposes. Numerous alternative arrangements are possible.

These and other illustrative embodiments described herein include, without limitation, methods, apparatus, systems, and computer program products comprising processor-readable storage media.

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Such systems are considered examples of what are more generally referred to herein as cloud computing environments.

Figure 1:
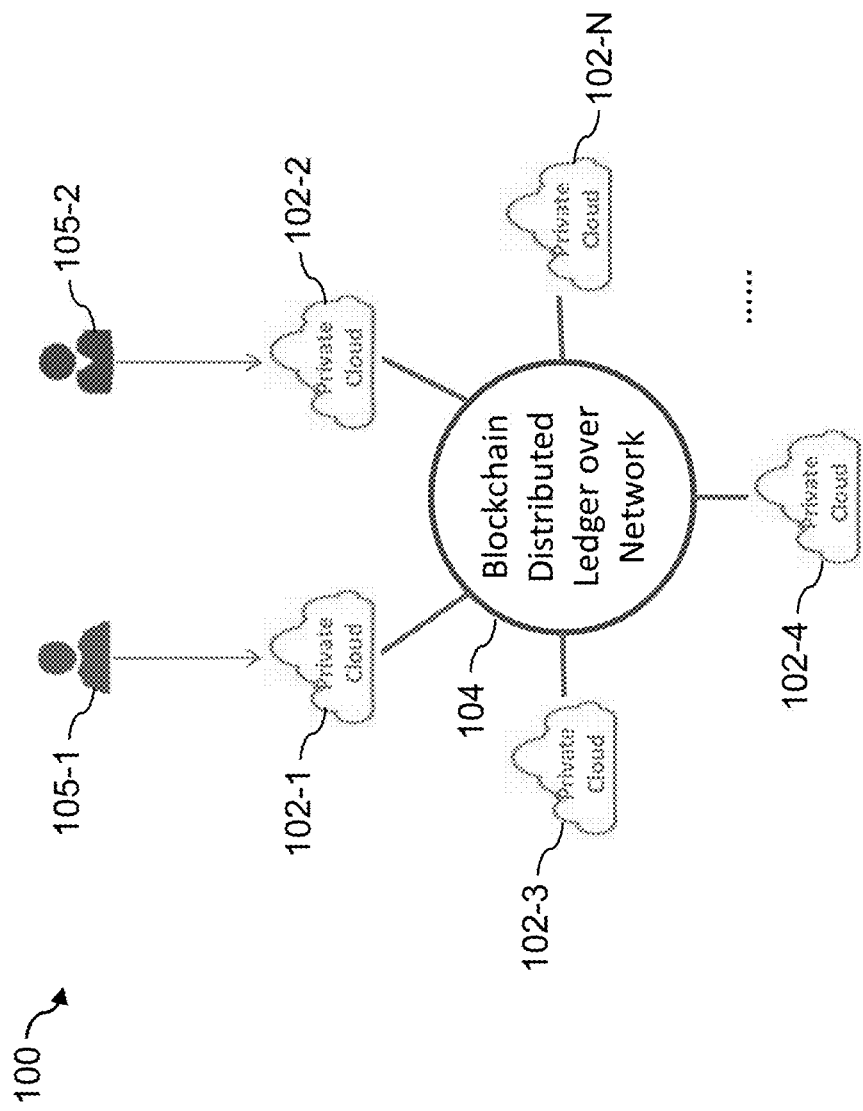
FIG. 1 is a block diagram of an information processing system comprising a distributed ledger for peer-to-peer cloud resource sharing in an illustrative embodiment.

FIG. 1 shows an information processing system 100 comprising a plurality of clouds 102-1, 102-2, 102-3, 102-4, . . . 102-N. The clouds 102 in this embodiment are assumed to be private clouds of respective enterprises or other entities. Each of the clouds 102 has one or more users. For example, clouds 102-1 and 102-2 have respective users 105-1 and 105-2. The clouds 102 have respective sets of cloud resources, such as compute, storage and network resources, in various configurations. The clouds 102 interact with one another over one or more networks that are not explicitly shown in order to collectively implement a peer-to-peer blockchain distributed ledger 104.

Although the clouds 102 in this embodiment are illustratively implemented as respective private clouds, in other embodiments one or more of the clouds 102 may each comprise a hybrid cloud that includes both private cloud and public cloud components. A wide variety of other private, public, hybrid or multi-cloud arrangements can be used.

The clouds 102 in this embodiment are more particularly assumed to comprise respective ledger nodes, although the ledger nodes are not explicitly shown in this figure. For example, the first cloud 102-1 is assumed to comprise a first ledger node, and the other clouds are assumed to comprise respective additional ledger nodes.

The first ledger node of the first cloud 102-1 is illustratively configured to communicate over the above-noted network(s) with the additional ledger nodes associated with respective additional ones of the clouds 102. The first and additional ledger nodes collectively maintain the blockchain distributed ledger 104. More particularly, the first and additional ledger nodes collectively maintain the blockchain distributed ledger 104 on a peer-to-peer basis without utilizing a centralized transaction authority.

The blockchain distributed ledger 104 collectively maintained by the ledger nodes of the respective clouds 102 illustratively provides a first ledger system that in some embodiments is configured to interface to one or more additional ledger systems maintained by respective sets of ledger nodes associated with other cloud groupings.

In operation, the first ledger node of the first cloud 102-1 establishes a cloud resource sharing transaction with at least one of the additional ledger nodes of the additional clouds 102, such as a second ledger node of the second cloud 102-2, and generates a corresponding cryptographic block characterizing the cloud resource sharing transaction. The cryptographic block is then entered into the blockchain distributed ledger 104 collectively maintained by the first and additional ledger nodes. For example, the cryptographic block may be entered after designated amounts of verification computations are successfully performed on that block within the ledger system. Numerous other techniques can be used to allow one or more ledger nodes or other ledger system entities to enter cryptographic blocks characterizing respective cloud resource sharing transactions into the blockchain distributed ledger 104.

The additional ledger nodes associated with respective ones of the other clouds 102 can also establish cloud resource sharing transactions with other ledger nodes of other clouds and generate corresponding cryptographic blocks characterizing those cloud resource sharing transactions, in a manner similar to that described above for the first ledger node of the first cloud 102-1. These cryptographic blocks are also entered into the blockchain distributed ledger 104 collectively maintained by the first and additional ledger nodes of the respective first cloud 102-1 and additional clouds 102.

A given cloud resource sharing transaction of the type described above can be configured so as to allow the user 105-1 of the first cloud 102-1 to utilize cloud resources of a given one of the additional clouds 102, such as any one of the clouds 102-2 through 102-N. As another example, a cloud resource sharing transaction can be configured to allow a user of a given one of the additional clouds to utilize cloud resources of the first cloud 102-1. Thus, a cloud resource sharing transaction can allow user 105-2 of the second cloud 102-2 to utilize cloud resources of the first cloud 102-1. A wide variety of other types of cloud resource sharing transactions can be entered into in the system 100 and reflected by corresponding cryptographic blocks entered into the blockchain distributed ledger 104.

The blockchain distributed ledger 104 in the FIG. 1 embodiment can be used to provide a federation relationship among the first and additional clouds 102. Such an arrangement allows the clouds 102 to be federated for purposes of sharing cloud resources among their respective users in a secure and efficient manner. Advantageously, embodiments of this type allow the enterprises or other types of entities that control respective ones of the clouds 102 to achieve relatively higher and more stable utilization levels for their respective sets of cloud resources than would otherwise be possible.

By way of example, the clouds 102 can be federated at a certification and resource definition level that includes, for each of the clouds 102, cloud quality and security certifications, remote attestation, and confirmed ability to provide at least a specified minimum level of cloud resources for use by other ones of the clouds.

A blockchain distributed ledger in some embodiments is implemented at least in part in the form of a distributed database across a public network that maintains a continuously-growing list of records more generally referred to herein as "blocks." Each block illustratively contains a timestamp and a link to a previous block. The blocks are generated using cryptographic techniques in order to allow each participant on the public network to manipulate the blocks in a secure way without the need for a central authority.

For example, cloud resource sharing transactions are entered as corresponding respective blocks into the distributed blockchain ledger, with each block referencing the previous block and being secured from tampering and revision through the use of designated cryptographic techniques. A given block is added to the blockchain distributed ledger only after successful cryptographic verification.

In some embodiments, any system user or other entity can verify the information in a given block by processing a signature in a block header using a public key of a corresponding account. However, only the "owner" of the corresponding account of the given block has the private key that allows full access to the block contents. The addition of new blocks to the blockchain distributed ledger may be advertised to all appropriate system entities.

The blockchain distributed ledger is illustratively configured to provide transparency and immutability of cloud resource sharing transactions in that changes to the blockchain distributed ledger are publicly viewable by all participants and the corresponding transactions cannot be altered or deleted. Overhead costs are significantly reduced in these and other illustrative embodiments by eliminating the need for a centralized authority or other similar third party intermediary.

The clouds 102 and other clouds referred to herein are illustratively implemented by cloud infrastructure comprising one or more processing platforms. Although the present embodiment utilizes private clouds, the term "cloud" as used herein is intended to be more broadly construed and may comprise a private cloud, a public cloud, a hybrid cloud or combinations of multiple clouds of different types.

The cloud resources implemented by the clouds 102 can include container-based compute functionality and associated storage systems. Such storage systems in some embodiments are configured to store data under the control of its associated entity and are assumed to be part of the corresponding cloud.

A given one of the clouds 102 illustratively comprises a plurality of host devices configured to support execution of applications on behalf of multiple users, although such host devices are not explicitly shown in the figure. For example, the host devices of a given one of the clouds 102 may comprise respective container host devices. Cloud native applications can execute in respective application containers implemented utilizing the container host devices. The container host devices may comprise Docker containers, LXD containers, Cloud Foundry Diego-based containers or other types of containers. These and other host devices are examples of what are more generally referred to herein as "processing devices."

It should be noted that references above and elsewhere herein to container host devices should not be viewed as limiting in any way. Other embodiments can utilize other types of host devices, including virtual machines and "bare metal" hosts. The term "host device" as used herein is therefore intended to be broadly construed.

One or more of the clouds 102 can each be implemented using a layered architecture. For example, such a cloud can comprise a Platform-as-a-Service (PaaS) layer overlying an Infrastructure-as-a-Service (IaaS) layer. The IaaS layer may illustratively comprise a plurality of virtual machines configured to support application containers or other containers of the PaaS layer of the cloud.

A storage system of a given one of the clouds 102 illustratively includes at least one storage platform implementing one or more of block storage, object storage and file storage, although additional or alternative types of storage platforms can be used in other embodiments. The block storage may be implemented using a software-defined storage product such as ScaleIO™ to provide a virtual storage area network (vSAN). The object storage may be implemented using a cloud storage product such as Elastic Cloud Storage (ECS). The file storage may be implemented using Isilon® platform nodes and associated accelerators in the S-Series, X-Series and NL-Series product lines. The above-mentioned storage products are from Dell EMC of Hopkinton, Mass.

Different combinations of these and numerous other storage products can also be used in implementing a given storage platform in an illustrative embodiment. Additional examples of storage products that may be used in other embodiments include VNX® and Symmetrix VMAX® storage arrays, flash-based storage arrays such as DSSD™ and XtremIO™, object-based storage products such as Atmos®, and software-defined storage products such ViPR, also from Dell EMC.

As mentioned previously, the blockchain distributed ledger 104 collectively maintained by the ledger nodes of the respective clouds 102 may provide a first ledger system that is configured to interface to one or more additional ledger systems maintained by respective sets of ledger nodes associated with other cloud groupings.

Figure 2:
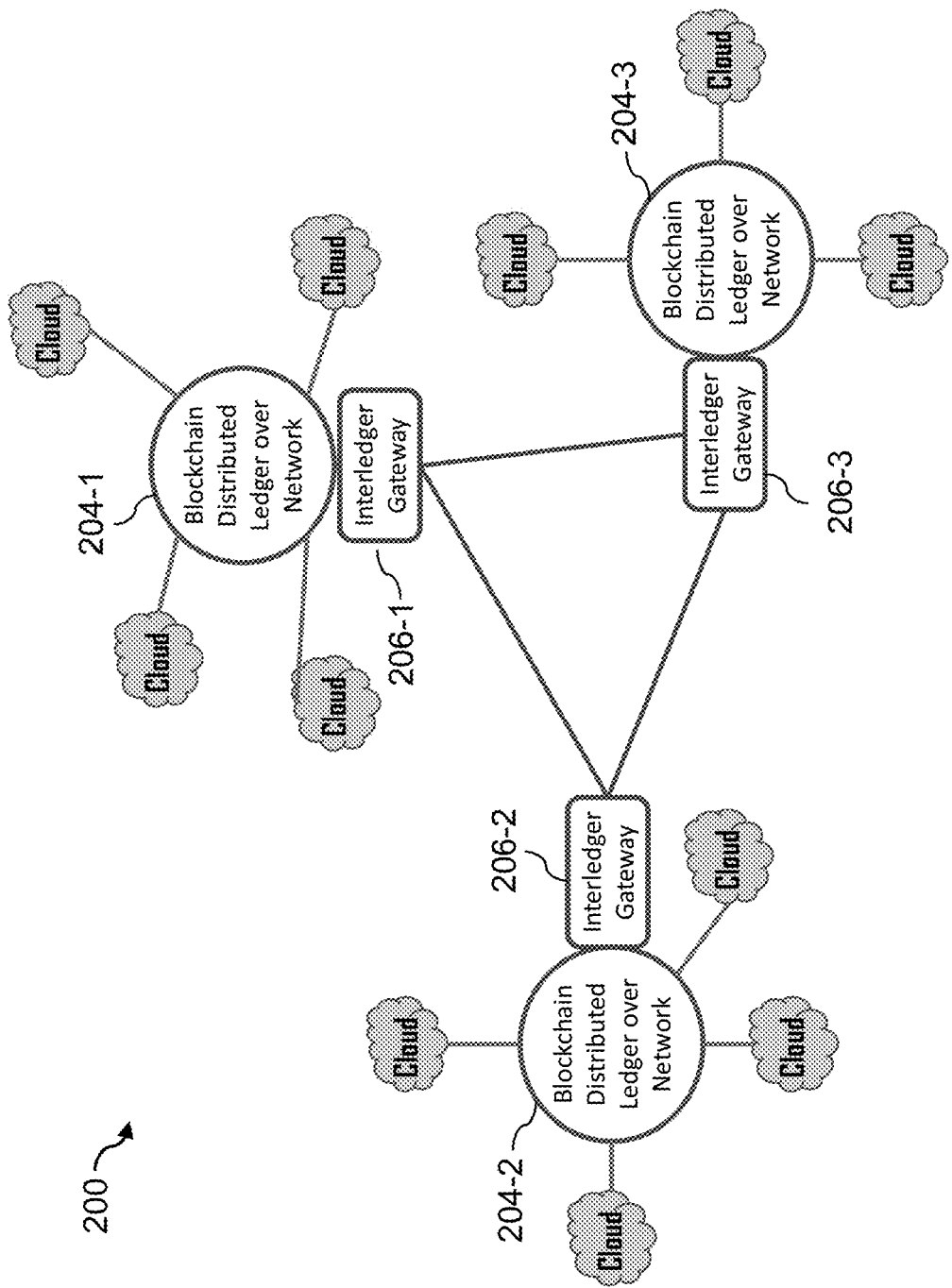
FIG. 2 is a block diagram of an information processing system in which multiple distinct ledger systems of the type shown in FIG. 1 are interfaced to one another via respective interledger gateways.

An example of an embodiment of this type is illustrated in FIG. 2. In the FIG. 2 embodiment, an information processing system 200 comprises a plurality of distinct ledger systems, each comprising a corresponding blockchain distributed ledger maintained collectively by an associated plurality of clouds. The system 200 in this example more particularly comprises first, second and third blockchain distributed ledgers 204-1, 204-2 and 204-3 each associated with a separate group of multiple clouds. The blockchain distributed ledgers 204-1, 204-2 and 204-3 are interfaced to one another via respective interledger gateways 206-1, 206-2 and 206-3 as illustrated.

Each of the blockchain distributed ledgers 204 and the ledger nodes of its respective clouds collectively provide a distinct ledger system that is interfaced via a corresponding one of the interledger gateways 206 to additional ledger systems. The additional ledger systems are each collectively maintained by a different group of clouds and have respective additional blockchain distributed ledgers 204. Each of the ledger systems comprises a corresponding one of the interledger gateways 206 configured to support communication between that ledger system and other ones of the ledger systems. The interledger gateways 206 therefore interconnect multiple ledger systems to form a larger decentralized peer-to-peer cloud system with secure sharing of cloud resources between the clouds.

The interledger gateways 206 are illustratively configured to allow contracts and tokenized objects or other associated data to be passed between the different ledger systems. For example, the interledger gateways can be configured to provide transactional integrity to interledger transactions spanning several distinct blockchain distributed ledgers associated with respective ones of the ledger systems.

The functionality of a given one of the interledger gateways 206 may be implemented in a separate node or other processing device associated with one of the clouds that maintains the corresponding blockchain distributed ledger 204-1, 204-2 or 204-3. Alternatively, such functionality may be implemented in a distributed manner over multiple nodes of respective ones of the clouds that maintain the corresponding blockchain distributed ledger 204-1, 204-2 or 204-3. For example, in some embodiments, the interledger gateway functionality of a blockchain distributed ledger can be distributed over ledger nodes of respective clouds that maintain the corresponding blockchain distributed ledger. It is therefore possible in some embodiments that a ledger node of one of the clouds can additionally be utilized to implement at least a portion of an associated interledger gateway.

Although three blockchain distributed ledgers 204 and respective interledger gateways 206 are shown in FIG. 2, this is by way of illustrative example only, and more or fewer blockchain distributed ledgers and corresponding interledger gateways may be implemented in other embodiments.

Additional illustrative embodiments of information processing systems with distributed ledgers for peer-to-peer cloud resource sharing will now be described with reference to FIGS. 3, 4, 5 and 6.

Figure 3:
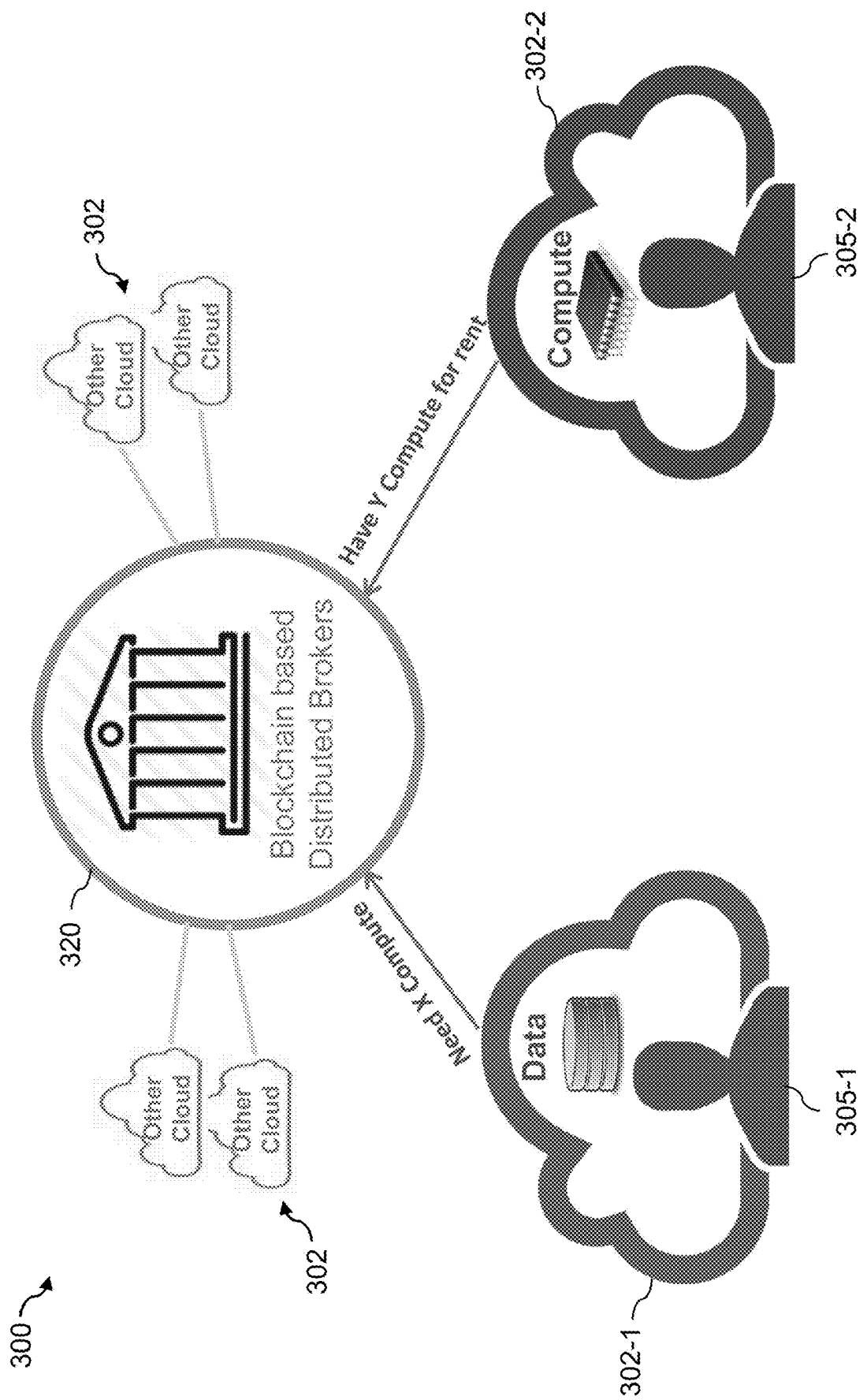
FIGS. 3, 4, 5 and 6 illustrate additional embodiments of information processing systems with distributed ledgers for peer-to-peer cloud resource sharing.

FIG. 3 shows an information processing system 300 comprising a first cloud 302-1, a second cloud 302-2, and a plurality of other clouds. The first and second clouds 302-1 and 302-2 have respective first and second users 305-1 and 305-2. It is assumed that each of the clouds 302 comprises a ledger node implemented on a corresponding processing platform or processing device, although such ledger nodes are not explicitly shown in this figure. The ledger nodes collectively implement a blockchain based distributed broker arrangement 320 for designated cloud services that are provided at least in part utilizing sets of cloud resources of the respective first, second and other clouds.

In this embodiment, it is assumed that the first user 305-1 of first cloud 302-1 needs an amount X of compute resources of one or more other clouds to process its data stored within the first cloud 302-1. It is further assumed that the second cloud 302-2 has an amount Y of compute resources available for "rent" by other users in other clouds, such as first user 305-1 of first cloud 302-1.

The ledger nodes of the respective first and second clouds 302-1 and 302-2 establish one or more cloud resource sharing transactions in order to allow the first user 305-1 of the first cloud 302-1 to utilize available compute resources of the second cloud 302-2. For example, if the amount X of needed compute resources of first cloud 302-1 is exactly matched by the amount Y of available compute resources of second cloud 302-2, a single cloud resource sharing transaction can be established by ledger nodes of the respective clouds 302-1 and 302-2. Alternatively, if X is some multiple of Y, the ledger node of the first cloud 302-1 may interact with respective ledger nodes of one or more additional clouds 302 of the system 300 in order to establish one or more additional cloud resource sharing transactions so as to ensure that first user 305-1 of first cloud 302-1 obtains its needed amount X of compute resources.

For any such cloud resource sharing transactions, the associated ledger nodes generate corresponding cryptographic blocks that characterize those transactions. The cryptographic blocks are entered into a blockchain distributed ledger collectively maintained by the ledger nodes of the respective clouds 302. The blockchain distributed ledger in this embodiment provides the blockchain based distributed broker arrangement 320 that allows the users of the various clouds 302 of the system 300 to share compute resources and other cloud resources of one or more other ones of the clouds 302.

A given cryptographic block characterizing a cloud resource sharing transaction is generated in some embodiments at least in part as a function of one or more smart contracts and associated data maintained by a smart contract engine of a ledger node of a corresponding one of the clouds 302.

In the FIG. 3 embodiment, the clouds 302 share cloud resources on a peer-to-peer basis responsive to user demands and other factors. The blockchain based distributed broker arrangement 320 allows the ledger node of a given one of the clouds to collect resource status and usage information from the ledger nodes of the other clouds. Additional functionality such as provisioning, monitoring and billing is provided in a fair, secure and efficient manner using the blockchain distributed ledger collectively maintained by the ledger nodes.

Figure 4:
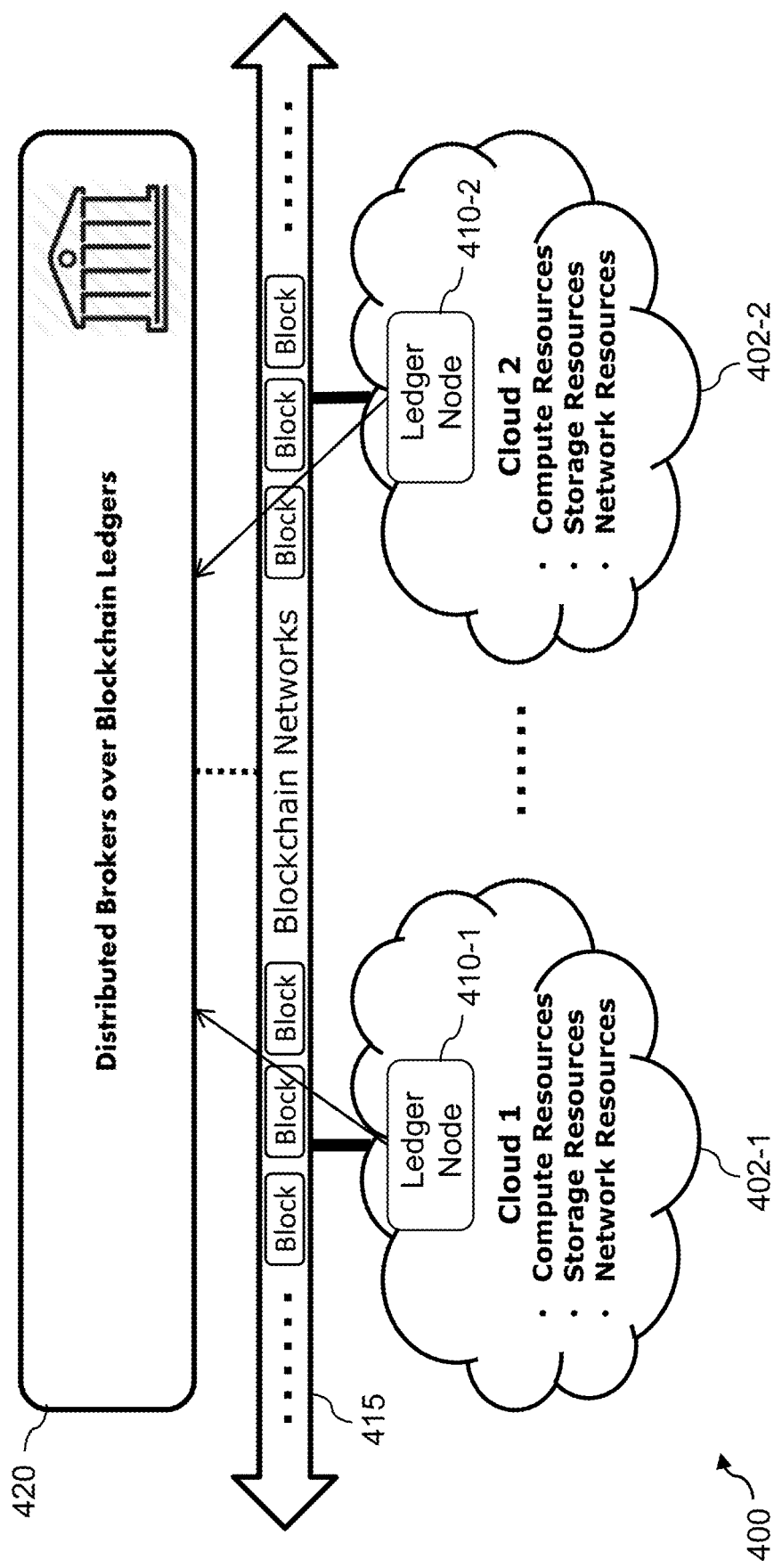

Referring now to FIG. 4, another illustrative embodiment of an information processing system 400 comprises first and second clouds 402-1 and 402-2, also denoted as Cloud 1 and Cloud 2, respectively. Each of the clouds 402-1 and 402-2 includes cloud resources such as compute resources, storage resources and network resources, and a ledger node 410-1 or 410-2. The ledger nodes 410 are operative to generate cryptographic blocks characterizing cloud resource sharing transactions for entry into blockchain networks 415.

It should be noted that a "blockchain network" as that term is broadly used herein is intended to encompass a wide variety of different types of network interactions associated with maintenance of a blockchain distributed ledger. Such interactions can take place over multiple distinct physical networks of different types.

The blockchain networks 415 and associated interactions between the ledger nodes 410 of the respective clouds 402 provide a blockchain based distributed broker arrangement 420 for sharing of cloud resources within the system 400. As in one or more other embodiments, the blockchain based distributed broker arrangement 420 in this embodiment is a peer-to-peer arrangement that is fully decentralized across the participating clouds such that no third party transaction authority is utilized. The ledger nodes 410 in this embodiment illustratively provide respective cloud-specific application interfaces for generation of cloud resource sharing requests and associated responses within the system 400. For example, each of the ledger nodes 410 can generate offers to obtain particular cloud services from other clouds and/or offers to provide particular cloud services to other clouds.

The ledger nodes 410 can implement smart contract functionality for facilitating negotiation of cloud resource sharing transactions. In some embodiments, the ledger nodes 410 are configured to implement auction functionality in conjunction with offers to obtain or provide cloud services. Billing for cloud services can be carried out using a cryptocurrency that is supported by the blockchain networks 415.

Figure 5:
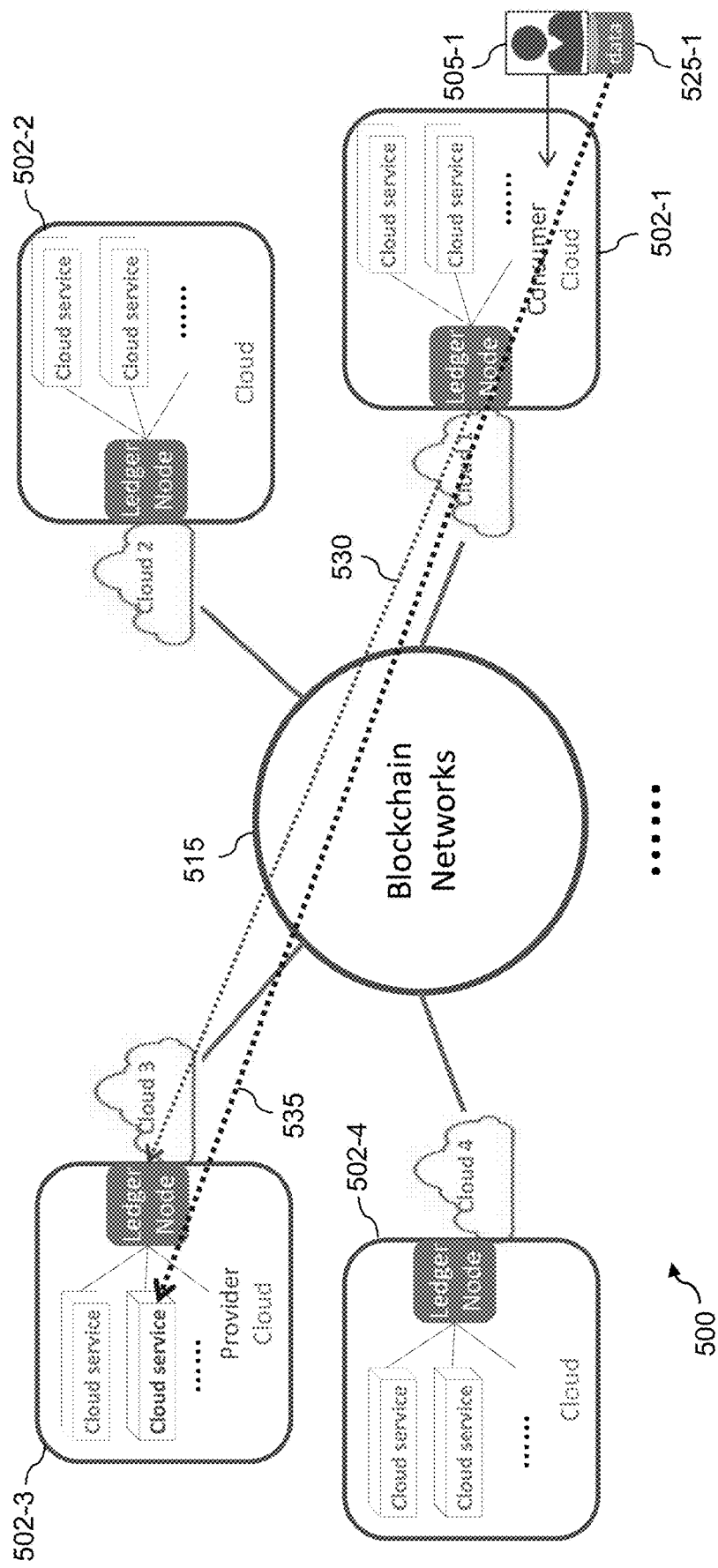

FIG. 5 illustrates an information processing system 500 comprising a plurality of clouds 502-1, 502-2, 502-3 and 502-4 that are configured to communicate with one another over blockchain networks 515. The clouds 502 are also designated as Cloud 1, Cloud 2, Cloud 3 and Cloud 4, respectively. Each of the clouds 502 comprises a ledger node and implements a plurality of cloud services utilizing its cloud resources.

In this embodiment, a user 505-1 is associated with cloud 502-1. For example, the user 505-1 is illustratively a tenant of cloud 502-1 which is assumed in this embodiment to be implemented as a consumer cloud. The user 505-1 has data 525-1 which is to be processed using cloud services available within the system 500. Further assuming that the data 525-1 of the user 505-1 is of a type or configuration that cannot be fully processed using local cloud resources of the cloud 502-1, the ledger node of that cloud negotiates with the ledger node of cloud 502-3 in order to obtain access to remote cloud resources services needed to process the data 525-1 of the user 505-1. The cloud 502-3 is therefore a provider cloud relative to the consumer cloud 502-1 for purposes of this particular cloud resource sharing arrangement.

The interaction between the ledger nodes of clouds 502-1 and 502-3 is designated by reference numeral 530 in the figure. The resulting remote access via local cloud 502-1 to cloud services of remote cloud 502-3 for processing data 525-1 is designated by reference numeral 535 in the figure. It should be noted that a given one of the clouds 502 can be both a consumer cloud and a provider cloud at the same time for different users of the system 500.

After establishing one or more cloud resource sharing transactions to reflect the arrangement between the clouds 502-1 and 502-3 with regard to user 505-1, at least one of the corresponding ledger nodes generates a cryptographic block characterizing the cloud resource sharing transaction, and the cryptographic block is entered into a distributed ledger of the blockchain networks 515. Multiple such blocks can be generated for different aspects of the transaction. For example, separate blocks can be generated for cryptocurrency contract and cloud service contract aspects of the transaction. Alternatively, multiple such smart contracts can be characterized by a single block.

Figure 6:
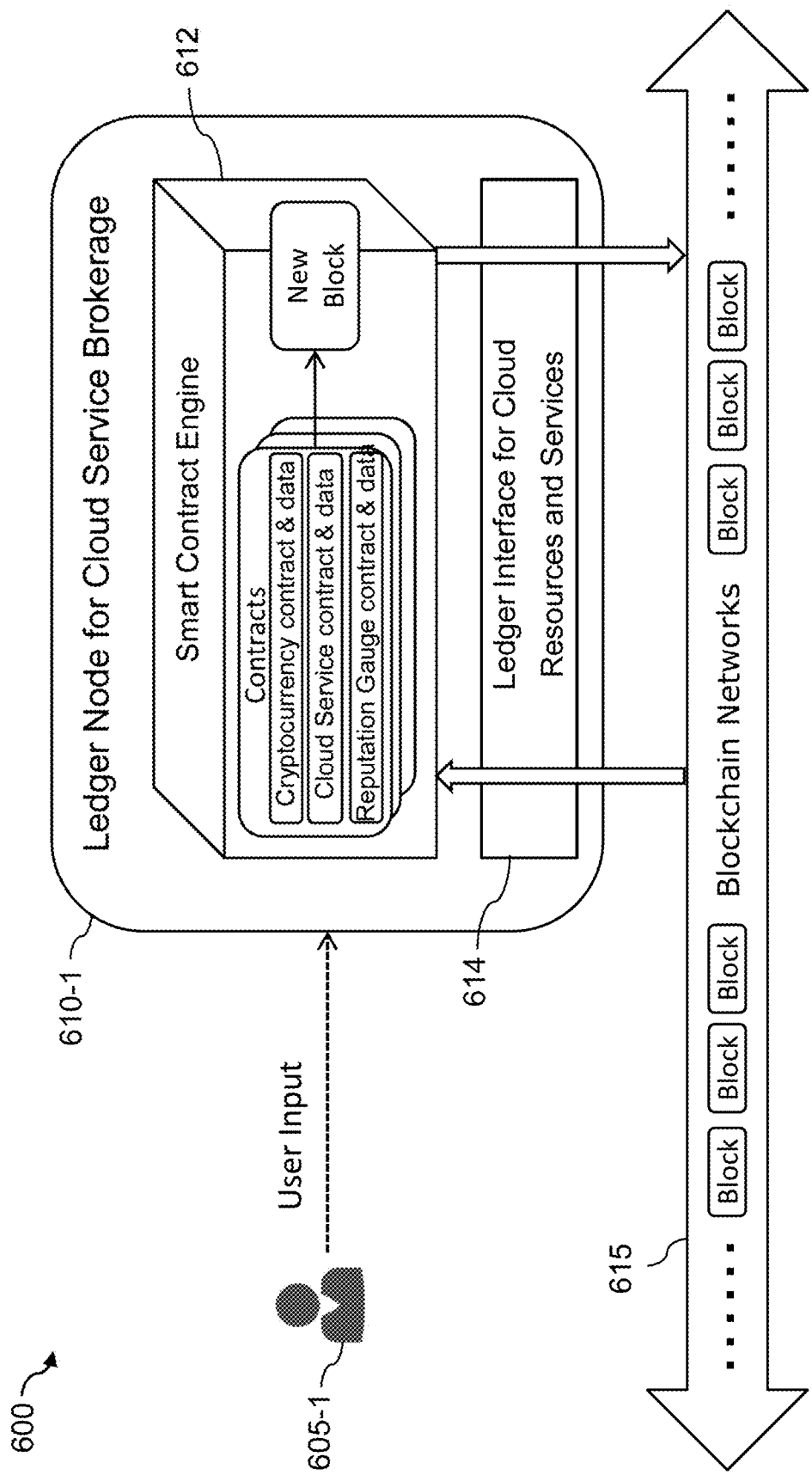

A more detailed view of a ledger node in an illustrative embodiment is shown in FIG. 6. In this embodiment, an information processing system 600 comprises ledger node 610-1. It is assumed that the ledger node 610-1 is associated with a particular cloud of the system 100, such as a private, public or hybrid cloud of the system 600. The ledger node 610-1 is illustratively implemented within the corresponding cloud but in other embodiments could be implemented at least in part externally to its corresponding cloud. The ledger node 610-1 receives user input from a user 605-1 of its corresponding cloud. For example, user 605-1 can request via the ledger node 610-1 the performance of particular cloud services for data provided to or stored in the cloud on behalf of that user.

The ledger node 610-1 in the present embodiment comprises a smart contract engine 612 and a ledger interface 614 for cloud resources and services. The ledger interface 614 is coupled to blockchain networks 615 that are collectively maintained by the ledger node 610-1 and additional ledger nodes associated with respective additional clouds of the system 600, although such additional ledger nodes and clouds are not explicitly shown in the figure. It is assumed that each of the additional ledger nodes of the system 600 is configured in a manner similar to that illustrated for ledger node 610-1.

The smart contract engine 612 in this embodiment generates cryptographic blocks that are entered into one or more distributed ledgers of the blockchain networks 615. Each such cryptographic block illustratively characterizes a cloud resource sharing transaction established between the ledger node 610-1 and one or more other ledger nodes of the system 600 for sharing of cloud resources between the corresponding clouds. The distributed ledger is collectively maintained by the ledger node 610-1 and multiple additional ledger nodes of respective additional clouds of the system 600.

The smart contract engine 612 is more particularly configured to generate a cryptographic block ("new block") characterizing a given cloud resource sharing transaction at least in part as a function of one or more smart contracts and associated data maintained by the smart contract engine 612. The smart contracts in this embodiment comprise a cryptocurrency contract and associated data, a cloud service contract and associated data, and a reputation gauge contract and associated data, although it is to be appreciated that additional or alternative contracts can be used in other embodiments.

A given instance of the cryptocurrency contract illustratively specifies a type and amount of cryptocurrency to be received by one of the clouds of system 600 for utilization of its cloud resources by another one of the clouds. Examples of cryptocurrency contracts that may be utilized in illustrative embodiments include those associated with cryptocurrencies such as Bitcoin, Ethereum and Hyperledger. The use of cryptocurrency contracts in illustrative embodiments ensures a common cloud currency and payment system for all participating clouds in the distributed ledger system.

A given instance of the cloud service contract illustratively specifies one or more service level agreements (SLAs) for provisioning and monitoring of shared cloud resources within the system 600. The cloud service contracts serve as bindings between cloud services offered and consumed by the participating clouds, also referred to herein as "ledger members." Such a cloud service contract may comprise a cryptographic protocol or other type of software program capable of facilitating, executing, and enforcing the terms of a corresponding cloud resources SLA. It is illustratively self-executing, self-enforcing, multi-dimensional, stateful and binding between provider and consumer clouds.

In some embodiments, a cloud service contract comprises a program that specifies particular cloud resources to be provided or consumed and a timeline of provision or consumption along with associated costs in units of designated cryptocurrency. It may also specify a contract completion report with mutual reputation calculation results to be further processed in accordance with a reputation gauge contract.

The cloud service contract program may be encrypted and sent out to other ledger members via the blockchain network. All ledger members may receive the program and each such member comes to an individual agreement with the requesting ledger member regarding the results of the program execution. The blockchain network would then update the distributed ledger to record the execution of the cloud service contract, and then monitor for compliance with the terms of that contract.

In some embodiments, ledger members periodically publish their available cloud resources to other ledger members. The available cloud resources of all of the ledger members collectively comprise a framework of asset registries. Each ledger member acts as a title registry and escrow agent for its corresponding available cloud resources. Such functionality is implemented in the ledger nodes of the respective clouds.

These embodiments illustratively implement an asset registry system for publishing and recording cloud resources. There may be multiple such registries for each ledger member depending upon the particular types of cloud resources available within the corresponding clouds. The registries may include information such as descriptions of available cloud resources as well as real-time consumption levels for cloud resources. Clouds may be required to demonstrate a designated "proof of stake" in order to become ledger members, such as proof of ownership of certain amounts of cloud resources and/or certain amounts of cryptocurrency for providing payment for cloud services.

As indicated previously, the cloud service contract represents a secure and verifiable binding between a cloud service request from one of the clouds acting as a consumer of cloud services and a corresponding cloud service offer from another one of the clouds acting as a provider of cloud services. The cloud service contract in some embodiments utilizes a contact script language.

Any one of the ledger members can add a remote workload to the system by first sending a workload request to all of the other ledger members. Each such member cloud that is willing to undertake the workload notifies the requesting cloud and the requesting cloud selects one of the notifying clouds. A cloud service contract is then generated and the workload is deployed to the appropriate cloud. Upon completion of the workload or under other conditions, the requesting cloud can delete the workload. The status of the workload during execution may be reflected in one or more blocks that are entered into the distributed ledger collectively maintained by the ledger members.

A given instance of the reputation gauge contract illustratively specifies a dual reputation score for a given one of the clouds of the system 600 as a provider of cloud services using its own cloud resources and as a consumer of cloud services using cloud resources of one or more of the other clouds. In some embodiments, the reputation gauge contract can generate pairs of such provider-consumer scores at each of a plurality of different stages in the execution of a cloud service contract, including generation of scores at runtime, partial or intermediate points and service completion.

The reputation gauge scores are illustratively generated in real time by smart contract engines of the corresponding ledger nodes based on actual performance of the provider and consumer clouds in cloud service contract execution.

In some embodiments, a given cloud service contract completion report includes both a request cloud contract fulfillment report and an offer cloud contract fulfillment report. The request cloud contract fulfillment report is utilized in computing the reputation gauge score for the requesting cloud and the offer cloud contract fulfillment report is utilized in computing the reputation gauge score for the offering cloud. Thus, the reputation gauge for a given cloud of the system includes separate reputation scores for that cloud as respective provider and consumer of cloud services. The reputation gauge characterizes a history of contract fulfillment of the given cloud and is available to the other clouds that are ledger members as well as other system entities such as users. The reputation gauge is carried as part of a reputation gauge contract characterized by one or more blocks that are generated by a smart contract engine of a ledger node and entered into the distributed ledger.

The reputation gauge in some embodiments is generated using a machine learning process. For example, each time performance under a cloud service contract is completed, separate smart contracts for reputation calculation of the participating clouds are generated, one for the provider cloud and one for the consumer cloud. All ledger members can execute the reputation gauge contracts and the results are permanently entered into reputation gauge accounts of the respective contract participants. Similar techniques can be used for partial results of provider and consumer performance under a cloud service contract. For example, during service runtime, partial results may be generated for a given cloud service contract based on real-time monitoring of the in-process performance of the consumer and provider clouds. The corresponding reputation gauge scores are reflected in reputation gauge contracts that are used to generate blocks for entry into the distributed ledger.

Failure of certain clouds to maintain designated minimum reputation gauge scores over time can serve to limit the ability of those clouds to enter cloud service contracts, and possibly lead to revocation of ledger memory status.

Again, numerous additional or alternative smart contracts can be implemented by the smart contract engine 612 of the ledger node 610-1 in other embodiments, so the cryptocurrency contract, cloud service contract and reputation gauge contract mentioned above should be considered illustrative examples only.

One or more of the particular smart contracts implemented by the smart contract engine 612 are utilized to generate the new block that is entered via the ledger interface 614 into the distributed ledger of the blockchain networks 615. Any of a wide variety of known cryptographic functions can be applied in generating the cryptographic blocks entered into the distributed ledger of the blockchain networks 615. Examples of such cryptographic functions can be found in A. J. Menezes et al., "Handbook of Applied Cryptography," CRC Press, August 2001, which is incorporated by reference herein.

In some embodiments, encryption services specified as part of a smart contract can include at least partial payload encryption and/or field level encryption for peer-to-peer workflows. These encryption services can utilize particular encryption types, such as homomorphic encryption, threshold encryption and many others, in order to provide appropriate levels of protection for data of the peer clouds.

A given blockchain distributed ledger in one or more of the embodiments described herein can provide federation of multiple otherwise unrelated clouds at certification and resource definition levels.

For example, various certifications may be required in order for a particular cloud to become a qualified ledger member. This may include providing cloud quality and security certifications, providing remote attestations, agreeing on resource definitions, and providing designated minimum amounts of cloud resources for use by other clouds. The latter illustratively includes minimum amounts of electronic memory in gigabytes (GB), minimum amounts of CPU resources in number of virtual CPUs (vCPUs) operating at a particular clock frequency, and network bandwidth in gigabits per second (Gbps).

Clouds offer their resources to other clouds using these and other resource definitions. Also, clouds can request use of the resources of other clouds using these and other resource definitions. Other examples of resource definitions include a number of virtual machines (VMs) where each such VM is defined in terms of memory resources, CPU resources and network bandwidth. It is also possible in some embodiments to specify other parameters associated with usage of cloud resources of other clouds, including by way of example distance from the local cloud to the remote cloud in terms of round-trip latency.

The illustrative embodiments described above provide significant advantages over conventional arrangements.

For example, some embodiments are configured to facilitate cloud resource sharing across multiple enterprises or other entities through peer-to-peer implementation of a distributed ledger. Such arrangements can advantageously allow the enterprises or other entities to achieve relatively higher and more stable utilization levels for their respective sets of cloud resources than would otherwise be possible.

Accordingly, illustrative embodiments can allow multiple private or hybrid clouds to be federated together for one enterprise or a group of similar enterprises. Secure and cost-effective techniques are provided to connect multiple existing cloud providers to form a shared and larger peer-to-peer cloud federation.

These and other embodiments permit economies of scale and lower prices per unit of consumption to be more readily achieved for private and hybrid clouds. For example, enterprise clouds can pool together their private cloud resources and form a secure peer-to-peer hybrid cloud federation. Such arrangements can eliminate the need for user interactions with public identity providers and centralized cloud brokers.

It is to be appreciated that the foregoing advantages and other advantages referred to herein are merely illustrative of advantages provided in certain embodiments, and need not be present in other embodiments.

As noted above, the private, public and hybrid clouds referred to herein are illustratively implemented by cloud infrastructure comprising one or more processing platforms. Such cloud infrastructure illustratively implements virtualization techniques for implementing virtual machines. The virtualization techniques may include operating system level virtualization techniques such as Linux containers (LXCs). Additionally or alternatively, other types of virtual machines such as those implemented using a hypervisor can be used. The term "virtual machine" as used herein is intended to be broadly construed to encompass, for example, a container implemented using operating system level virtualization, a virtual machine implemented using a hypervisor, or combinations thereof, such as a container configured to run in a hypervisor-based virtual machine.

A given enterprise storage system or other type of external storage system referred to herein is illustratively implemented by one or more storage platforms.

The term "storage platform" as used herein is intended to be broadly construed so as to encompass at least one storage array, at least one storage fabric or a combination of multiple instances of one or more of these and other types of storage devices and systems. For example, a given storage platform can comprise any of a variety of different types of storage including network-attached storage (NAS), storage area networks (SANs), direct-attached storage (DAS), distributed DAS and software-defined storage (SDS), as well as combinations of these and other storage types.

Storage platforms of the type described above may be part of a processing platform that also implements cloud infrastructure. Portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of at least one cloud or an associated enterprise storage system of the type disclosed herein can be implemented utilizing converged infrastructure.

Peer-to-peer distributed ledger functionality such as that described in conjunction with the embodiments of FIGS. 1-6 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Some illustrative embodiments are configured to facilitate the use of cloud computing by enterprises by allowing applications to execute in a public cloud while the data utilized by those applications remains securely stored in an enterprise storage system and is not persistently stored in the public cloud.

Enterprises with sensitive data, such as financial institutions, insurance companies and healthcare companies, can utilize the disclosed techniques to take advantage of external cloud computing resources without requiring that the data be moved to persistent storage of the external cloud. Such enterprises can retain full control of the particular manner in which their applications and data are utilized in the external cloud.

In addition, illustrative embodiments facilitate secure data federation, in which multiple distinct entities have data sets that are more valuable when used together for computation, but cannot be migrated. Examples of contexts in which such secure data federation is important include genomic processing, oil & gas exploration and other computation-intensive processing contexts using geographically-distributed data sets.

Illustrative embodiments can also facilitate the deployment of new applications in cloud infrastructure. These include applications that process data from multiple tenants, applications involving worldwide data in many clouds and locations, applications running worldwide in many clouds and locations, and applications requiring the same complete lifecycle control as their corresponding secure data.

Some embodiments are configured to support a converged infrastructure licensing model in which external compute resources are made available to enterprises for running applications using data that is persistently stored only in the storage systems of the respective enterprises and not in the clouds providing the external compute resources.

It should be noted that the particular arrangements of components in the systems of FIGS. 1-6 are presented by way of illustrative example only, and should not be construed as limiting in any way. As noted above, the described functionality can be implemented using additional or alternative components. Accordingly, a wide variety of different system, node and distributed ledger configurations can be used in other embodiments.

For example, a distributed ledger for peer-to-peer cloud resource sharing of the type disclosed herein can be implemented in numerous other information processing system configurations, including those system configurations described in U.S. patent application Ser. No. 15/268,788, filed Sep. 19, 2016 and entitled "Secure Data Access in Cloud Computing Environments," and U.S. patent application Ser. No. 15/354,486, filed Nov. 17, 2016 and entitled "Secure Data Proxy for Cloud Computing Environments," both of which are incorporated by reference herein.

A given application in such an embodiment can execute in a corresponding application container on a public cloud without any of its associated data being stored in persistent storage of that public cloud. Instead, data required for execution of the application is transferred from an external storage system into non-persistent storage of a secure data proxy and corresponding modified data are subsequently transferred back from the non-persistent storage of the secure data proxy to the external storage system.

An arrangement of this type provides enhanced security for the data of an enterprise storage system when the corresponding enterprise utilizes the public cloud for application execution. For example, the above-described application execution does not require persistent storage of the data in the public cloud. Such arrangements can advantageously alleviate any security concerns that enterprises might otherwise have if they had to transfer their private data into persistent storage of a public cloud. Enterprises can therefore obtain the numerous benefits associated with cloud computation while also ensuring that their private data remains secure within an enterprise storage system and is never persistently stored within the public cloud.

Accordingly, illustrative embodiments can accommodate those enterprises that want to maintain strict control over their applications and data by avoiding any persistent storage thereof in an external cloud. The data can be pulled as needed over a secure connection from enterprise storage into non-persistent memory of a public cloud such as the above-described non-persistent storage of the secure data proxy.

It should be understood that the particular sets of modules and other components implemented in the information processing systems as described above are presented by way of example only. In other embodiments, only subsets of these components, or additional or alternative sets of components, may be used, and such components may exhibit alternative functionality and configurations. For example, numerous alternative cloud computing environments can be configured to collectively provide a secure distributed ledger for cloud resource sharing as disclosed herein.

Peer-to-peer distributed ledger functionality such as that described in conjunction with the diagrams of FIGS. 1 through 6 can be implemented at least in part in the form of one or more software programs stored in memory and executed by a processor of a processing device such as a computer or server. A memory or other storage device having executable program code of one or more software programs embodied therein is an example of what is more generally referred to herein as a "processor-readable storage medium."

Communications between the various elements of an information processing system as disclosed herein may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

The particular processing platforms described above are presented by way of example only, and a given information processing system such as system 100 may include additional or alternative processing platforms, as well as numerous distinct processing platforms in any combination, with each such platform comprising one or more computers, servers, storage devices or other processing devices.

Such information processing system components can communicate with other system components over any type of network or other communication media.

It should again be emphasized that the above-described embodiments are presented for purposes of illustration only. Many variations and other alternative embodiments may be used. For example, the disclosed techniques are applicable to a wide variety of other types and arrangements of information processing systems, clouds, networks, distributed ledgers, ledger nodes, interledger gateways and other elements or components. Also, the particular configurations of system and device elements shown and described in conjunction with the illustrative embodiments of FIGS. 1-6 can be varied in other embodiments. Moreover, the various assumptions made above in the course of describing the illustrative embodiments should also be viewed as exemplary rather than as requirements or limitations of any particular embodiment. Numerous other alternative embodiments within the scope of the appended claims will be readily apparent to those skilled in the art.

What is claimed is:
1. An apparatus comprising:
at least one processing device comprising a processor coupled to a memory;
wherein the processing device is configured to implement a first ledger node of a first cloud having a first set of cloud resources;
the first ledger node of the first cloud being configured:
to communicate over one or more networks with a plurality of additional ledger nodes associated with respective additional clouds having respective additional sets of cloud resources, the first and additional clouds comprising respective separate processing platforms associated with respective unrelated enterprises;
to establish a cloud resource sharing transaction with at least one of the additional ledger nodes of the additional clouds; and
to generate two or more cryptographic blocks characterizing the cloud resource sharing transaction;
wherein the two or more cryptographic blocks are entered into a blockchain distributed ledger collectively maintained by the first and additional ledger nodes;
wherein the first and additional ledger nodes collectively maintain the blockchain distributed ledger on a peer-to-peer basis without utilizing a centralized transaction authority;
wherein the first and additional ledger nodes collectively implement a blockchain based distributed broker arrangement for designated cloud services that are provided at least in part utilizing the first and additional sets of cloud resources of the respective first and additional clouds;
wherein at least a given one of the two or more cryptographic blocks characterizes a given dual reputation score for said at least one additional cloud as a provider of cloud services and for the first cloud as a consumer of cloud services at a given stage of execution performed subsequent to commencement and prior to completion of the cloud resource sharing transaction, the given dual reputation score for the given stage of execution comprising partial results generated for the cloud resource sharing transaction based on real-time monitoring of in-process performance of the first cloud as the consumer of cloud services and said at least one additional cloud as the provider of cloud services.

2. The apparatus of claim 1 wherein at least a subset of the first and additional clouds comprise respective hybrid clouds.

3. The apparatus of claim 1 wherein the cloud resource sharing transaction allows a user of the first cloud to utilize cloud resources of a given one of the additional clouds.

4. The apparatus of claim 1 wherein the cloud resource sharing transaction allows a user of a given one of the additional clouds to utilize cloud resources of the first cloud.

5. The apparatus of claim 1 wherein the blockchain distributed ledger provides a federation relationship among the first and additional clouds.

6. The apparatus of claim 1 wherein the first and additional clouds are federated at a certification and resource definition level that includes for each of the clouds one or more of the following:
cloud quality and security certifications;
remote attestation; and
confirmed ability to provide at least a specified minimum level of cloud resources for use by other ones of the clouds.

7. The apparatus of claim 1 wherein the blockchain distributed ledger collectively maintained by the first and additional ledger nodes of the respective first and additional clouds provides a first ledger system that interfaces to one or more additional ledger systems each collectively maintained by a different group of clouds and having respective additional blockchain distributed ledgers.

8. The apparatus of claim 7 wherein each of the first and additional ledger systems comprises an interledger gateway supporting communication between that ledger system and other ones of the ledger systems.

9. The apparatus of claim 1 wherein at least one of the two or more cryptographic blocks characterizing the cloud resource sharing transaction is generated at least in part as a function of one or more smart contracts and associated data maintained by a smart contract engine of the first ledger node.

10. The apparatus of claim 9 wherein the smart contracts and associated data include a reputation gauge contract and associated data and at least one of:
   a cryptocurrency contract and associated data; and
   a cloud service contract and associated data.

11. The apparatus of claim 10, wherein a given instance of the cryptocurrency contract specifies a type and amount of cryptocurrency to be received by one of the clouds for utilization of its cloud resources by another one of the clouds.

12. The apparatus of claim 10 wherein a given instance of the cloud service contract specifies one or more service level agreements for provisioning and monitoring of shared cloud resources.

13. A method comprising:
   implementing a first ledger node of a first cloud having a first set of cloud resources;
   configuring the first ledger node to communicate over one or more networks with a plurality of additional ledger nodes associated with respective additional clouds having respective additional sets of cloud resources, the first and additional clouds comprising respective separate processing platforms associated with respective unrelated enterprises;
   establishing in the first ledger node a cloud resource sharing transaction with at least one of the additional ledger nodes of the additional clouds; and
   generating in the first ledger node two or more cryptographic blocks characterizing the cloud resource sharing transaction;
   wherein the two or more cryptographic blocks are entered into a blockchain distributed ledger collectively maintained by the first and additional ledger nodes;
   wherein the first and additional ledger nodes collectively maintain the blockchain distributed ledger on a peer-to-peer basis without utilizing a centralized transaction authority;
   wherein the first and additional ledger nodes collectively implement a blockchain based distributed broker arrangement for designated cloud services that are provided at least in part utilizing the first and additional sets of cloud resources of the respective first and additional clouds;
   wherein at least a given one of the two or more cryptographic blocks characterizes a given dual reputation score for said at least one additional cloud as a provider of cloud services and for the first cloud as a consumer of cloud services at a given stage of execution performed subsequent to commencement and prior to completion of the cloud resource sharing transaction, the given dual reputation score for the given stage of execution comprising partial results generated for the cloud resource sharing transaction based on real-time monitoring of in-process performance of the first cloud as the consumer of cloud services and said at least one additional cloud as the provider of cloud services;
   the method being performed by at least one processing device comprising a processor coupled to a memory.

14. The method of claim 13 wherein the blockchain distributed ledger collectively maintained by the first and additional ledger nodes of the respective first and additional clouds provides a first ledger system that interfaces to one or more additional ledger systems each collectively maintained by a different group of clouds and having respective additional blockchain distributed ledgers.

15. A computer program product comprising a non-transitory processor-readable storage medium having stored therein program code of one or more software programs, wherein the program code when executed by at least one processing device comprising a processor coupled to a memory causes the processing device:
   to implement a first ledger node of a first cloud having a first set of cloud resources;
   to configure the first ledger node to communicate over one or more networks with a plurality of additional ledger nodes associated with respective additional clouds having respective additional sets of cloud resources, the first and additional clouds comprising respective separate processing platforms associated with respective unrelated enterprises;
   to establish in the first ledger node a cloud resource sharing transaction with at least one of the additional ledger nodes of the additional clouds; and
   to generate in the first ledger node two or more cryptographic blocks characterizing the cloud resource sharing transaction;
   wherein the two or more cryptographic blocks are entered into a blockchain distributed ledger collectively maintained by the first and additional ledger nodes;
   wherein the first and additional ledger nodes collectively maintain the blockchain distributed ledger on a peer-to-peer basis without utilizing a centralized transaction authority;
   wherein the first and additional ledger nodes collectively implement a blockchain based distributed broker arrangement for designated cloud services that are provided at least in part utilizing the first and additional sets of cloud resources of the respective first and additional clouds;
   wherein at least a given one of the two or more cryptographic blocks characterizes a given dual reputation score for said at least one additional cloud as a provider of cloud services and for the first cloud as a consumer of cloud services at a given stage of execution performed subsequent to commencement and prior to completion of the cloud resource sharing transaction, the given dual reputation score for the given stage of execution comprising partial results generated for the cloud resource sharing transaction based on real-time monitoring of in-process performance of the first cloud as the consumer of cloud services and said at least one additional cloud as the provider of cloud services.

16. The computer program product of claim 15 wherein the blockchain distributed ledger provides a federation relationship among the first and additional clouds.

17. The computer program product of claim 15 wherein the first and additional clouds are federated at a certification and resource definition level that includes for each of the clouds one or more of the following:
   cloud quality and security certifications;
   remote attestation; and confirmed ability to provide at least a specified minimum level of cloud resources for use by other ones of the clouds.

18. The computer program product of claim 15 wherein the blockchain distributed ledger collectively maintained by the first and additional ledger nodes of the respective first and additional clouds provides a first ledger system that interfaces to one or more additional ledger systems each collectively maintained by a different group of clouds and having respective additional blockchain distributed ledgers.

19. The computer program product of claim 18 wherein each of the first and additional ledger systems comprises an interledger gateway supporting communication between that ledger system and other ones of the ledger systems.

20. The apparatus of claim 1 wherein generating the two or more cryptographic blocks characterizing the cloud resource sharing transaction comprises:
generating at least one additional one of the two or more cryptographic blocks characterizing at least one additional dual reputation score for said at least one additional cloud as a provider of cloud services and for the first cloud as a consumer of cloud services, the at least one additional dual reputation score being generated subsequent to completion of the cloud resource sharing transaction.

* * * * *